United States Patent
Sinks et al.

(10) Patent No.: US 11,575,694 B2
(45) Date of Patent: Feb. 7, 2023

(54) COMMAND AND CONTROL STEGANOGRAPHIC COMMUNICATIONS DETECTION ENGINE

(71) Applicant: Bank of America Corporation, Charlotte, NC (US)

(72) Inventors: Steven E. Sinks, Scottsdale, AZ (US); Jonathan Sheedy, Poynton (GB)

(73) Assignee: Bank of America Corporation, Charlotte, NC (US)

( * ) Notice: Subject to any disclaimer, the term of this patent is extended or adjusted under 35 U.S.C. 154(b) by 103 days.

(21) Appl. No.: 17/153,605

(22) Filed: Jan. 20, 2021

(65) Prior Publication Data

US 2022/0232019 A1    Jul. 21, 2022

(51) Int. Cl.
*H04L 29/06* (2006.01)
*H04L 9/40* (2022.01)

(52) U.S. Cl.
CPC ...... *H04L 63/1416* (2013.01); *H04L 63/0236* (2013.01); *H04L 63/123* (2013.01); *H04L 63/1433* (2013.01); *H04L 63/1441* (2013.01)

(58) Field of Classification Search
CPC ............. H04L 63/1416; H04L 63/0236; H04L 63/123; H04L 63/1433; H04L 63/1441
See application file for complete search history.

(56) References Cited

U.S. PATENT DOCUMENTS

| | | | |
|---|---|---|---|
| 6,324,573 B1 | 11/2001 | Rhoads | |
| 7,620,253 B2 | 11/2009 | Miller et al. | |
| 7,797,411 B1 | 9/2010 | Guruswamy et al. | |
| 7,822,226 B2 | 10/2010 | Hannigan et al. | |
| 8,307,212 B2 | 11/2012 | Van Wie et al. | |
| 8,610,709 B2 | 12/2013 | Choi et al. | |
| 10,708,297 B2 * | 7/2020 | Woods | H04L 63/20 |
| 2013/0097699 A1 * | 4/2013 | Balupari | H04L 63/1441 726/22 |
| 2015/0026464 A1 * | 1/2015 | Hanner, Sr. | H04L 63/0245 713/168 |
| 2018/0219888 A1 * | 8/2018 | Apostolopoulos | G06F 16/9024 |
| 2019/0222586 A1 * | 7/2019 | Sachkov | G06N 20/00 |
| 2019/0364057 A1 * | 11/2019 | Hazay | H04L 63/1425 |
| 2021/0192019 A1 * | 6/2021 | Lwowski | G06N 3/088 |

* cited by examiner

*Primary Examiner* — Kambiz Zand
*Assistant Examiner* — Afaq Ali
(74) *Attorney, Agent, or Firm* — Banner & Witcoff, Ltd.

(57) ABSTRACT

A network security computing system includes a steganographic communications analysis engine monitoring incoming and outgoing messages on a secure computing network. The steganographic communications analysis engine identifies a pattern of file transfers between a first computing device on the secure computing network and an internal or external message recipient. When a pattern is identified, the steganographic communications analysis engine quarantines an associated computing device from the secure network. The steganographic communications analysis engine analyzes files transferred between the computing device and the recipient for indications of steganographic information and causes display, based on an identified indication of steganography, an indication that the computing device had been compromised by command and control malware.

20 Claims, 5 Drawing Sheets

COMMAND AND CONTROL STEGANOGRAPHIC COMMUNICATIONS DETECTION ENGINE

BACKGROUND

Unauthorized individuals may attempt gain access to a secure computing system through a compromised networked computing device to obtain increased privileges using various tools. For example, an attacker may use command and control (C2) servers to send commands to systems compromised by malware and/or to receive unauthorized data obtained from a targeted compromised network. Many C2 server-controlled attacks have been found through their use of cloud-based webmail and/or file-sharing services when the C2 servers attempt to blend in with normal traffic to avoid detection. Threat actors have difficulty hiding unauthorized C2 communication in plain sight, so that C2 communication may often be sent over encrypted communication channels using secure communication protocols, such as Secure Socket Layer (SSL), Transport Layer Security (TLS) and the like. Because of this, and for other security reasons, enterprise network security systems limit outside network traffic to use of certain protocols (e.g., hypertext transfer protocol (HTTP), HTTP secure (HTTPS) and the like), use of specified naming systems (e.g., domain name system (DNS)), for applications (e.g., email), and/or browser-based connections. Often, browser-based connections and/or application traffic may have their traffic heavily monitored for communication to recipients within and/or outside the network.

In an attempt to keep ahead of enterprise security measures, attackers continually adapt their methods to use unencrypted communications in an attempt to keep ahead of the ability of enterprise network security procedures. Because sophisticated means of intercepting encrypted files are currently available, perpetrators may focus on alternative ways of avoiding data security. One alternative approach is referred to as steganography (e.g. the digital equivalent of invisible ink), in which malevolence occurs in plain sight, often embedded in image, audio, text, and/or other files.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity. For example, aspects of the disclosure relate to cyber security for enterprise computing systems. One or more aspects of the disclosure relate to testing and/or monitoring unencrypted network communications by a steganographic communication monitor test network security measures.

In some cases, a network security computing system may include a steganographic communications analysis engine monitoring incoming and outgoing messages on a secure computing network. The steganographic communications analysis engine may identify a pattern of file transfers between a computing device on the secure computing network and an internal or external message recipient. When a pattern is identified, the steganographic communications analysis engine may quarantine the associated computing device from the secure network. The steganographic communications analysis engine analyzes files transferred between the computing device and the recipient for indications of steganographic information and may cause display, based on an identified indication of steganography, an indication that the computing device had been compromised by command and control malware.

In some cases, the computing device from the secure network comprises disabling incoming and outgoing communications from the computing device. In some cases, the plurality of incoming and outgoing messages comprises a plurality of image file transfers. In some cases, the alert comprises an electronic message comprising an indication of the quarantined computing device, information corresponding to the identified pattern of file transfers and a link to an image file and information corresponding to identified stenographic encoded information. In some cases, disabling, by the steganographic communications analysis engine, network access to the recipient of a plurality of messages corresponding to the pattern of file transfers. In some cases, the recipient of a plurality of messages corresponding to the pattern of file transfers comprises an internet website. In some cases, the recipient of a plurality of messages corresponding to the pattern of file transfers comprises a second computing device on the secure network.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
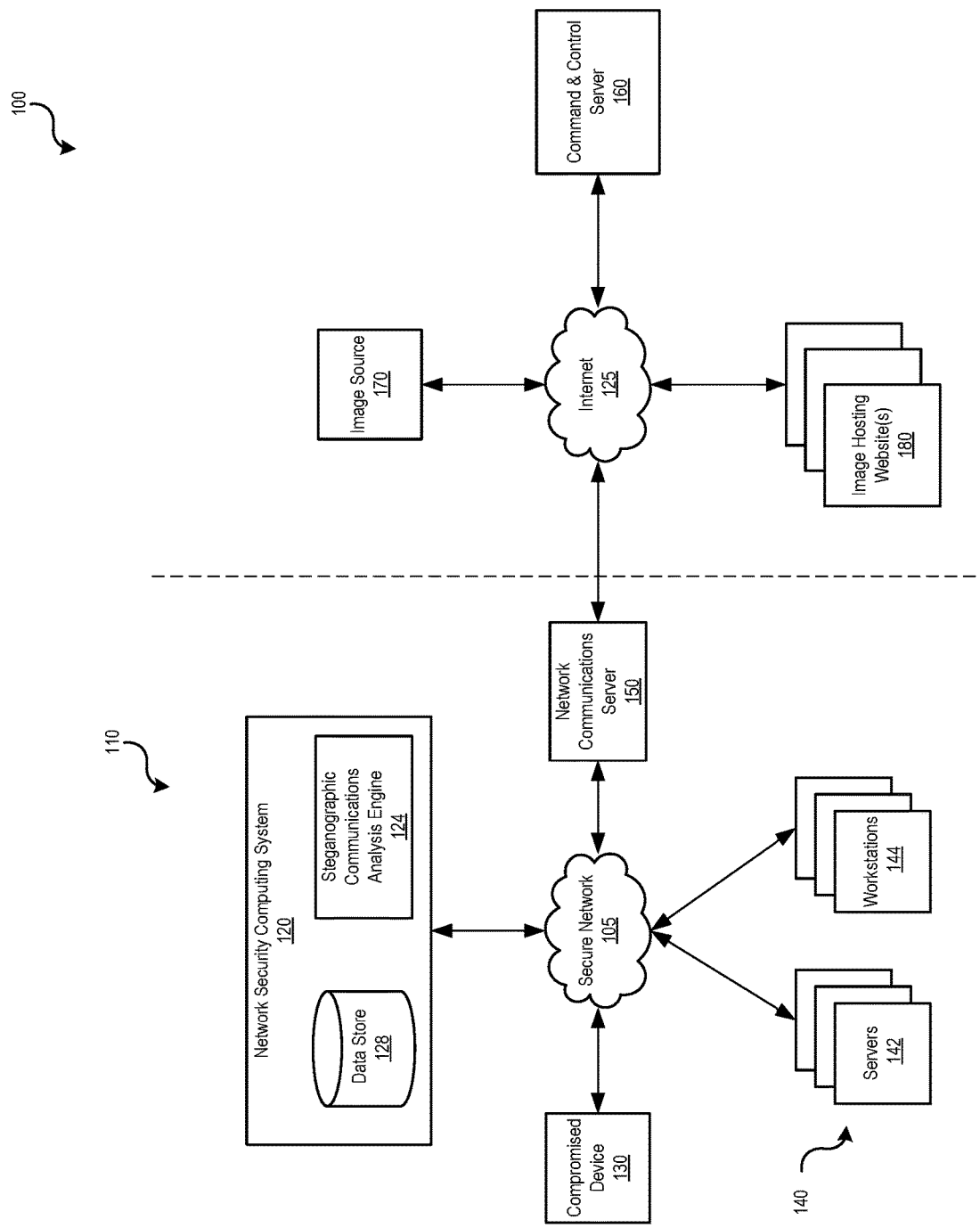
FIG. 1 shows an illustrative block diagram showing an example of a command and control steganographic communications detection engine monitoring a networked computing system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (i.e., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, control computers, nodes, personal computers, portable electronic devices, servers, worker computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some example arrangements in which the systems described herein may be used. Various other arrangements employing aspects described herein may be used without departing from the invention.

As discussed herein, a steganographic (stego-) file may contain image content and/or audio content, where data is surreptitiously embedded in the image and/or audio content. For example, a common approach is to embed hidden data within an image. In an illustrative method, the least significant bit of a pixel may be overwritten by an encrypted stream of secondary stego-bits such that the primary public content of the image is not destroyed and/or distorted with notable artifacts. A stego-file may be directly transferred (for example, via file transfer protocol (FTP), hypertext transfer protocol (HTTP), and the like) between computing devices.

For example, an image file may be transported as an attachment in an e-mail message, and/or may be accessed remotely via a website, such as a blog, a social media website, a photo-sharing website, a commercial website, or a website capable of accessing and/or hosting image files.

According to traditional approaches, a file is examined as to whether the file is a steganographic file using a detection approach. Digital methodologies may be used on many common file types, including GIF, BMP, MP3, WAV, and JPG. Traditional approaches to counter stego-files include filtering different file types at the firewall, deleting inactive user accounts, being aware of files of unknown/questionable origin, and performing a file audit. While use of image files are discussed in the illustrative examples discussed below, the systems and methods may also be applied to other steganographic file types.

According to traditional approaches, when an embedded message is hidden in an image of a stego-file, one needs to check for all the possible ways that it may be a stego-file, given that the corresponding original image is typically unknown. There cannot be any universal algorithm to detect steganography. Consequently, detecting a stego-image file is typically very difficult and almost impossible with current technology. One theoretical approach is to store every possible image and to compare the image of the stego-image file with each stored possible image to determine if there is a subtle difference. This is hardly a viable approach with available technology (and may never be). With an aspect of the embodiments, as will be discussed, the above approach is circumvented.

Command and control (C2) servers may be used by malicious actors to maintain communications with compromised systems within a target network. The C2 servers may issue commands and/or controls to compromised computing devices or systems, such as Internet-connected computers users, some of which may be used to form botnets or to access/intercept private or non-public information. These commands and/or controls may be as simple as maintaining a timed beacon or "life beat" to allow the malicious actors running the attack to identify compromised computing systems within the target network. In some cases, the malicious actors may send commands and/or controls to perform more malicious actions, such as remote control, data exfiltration, and the like. While the C2 server may be used to control a compromised computing device on the inside of the target organization, the compromised computing device usually initiates any communications from inside the network to a C2 server on the public Internet.

In some cases, a malware infection may be initiated via email phishing attempts, or other similar methods. This technique may cause a user to mistakenly open an attachment or select a link to a malicious website, which may have an embedded malicious payload. This payload may then take advantage of a system vulnerability to compromise the computing device. The specific methods used may depend on the operating system and/or the application that is used when opening the attachment or accesses the link.

Most organizations only allow known and/or approved traffic into their networks, but may be less strict in the allowed communications to the internet. Malicious actors may program malware assuming that the target organization has restrictions in place to prevent inbound connections through its firewalls. They may also write malicious code to evade known or anticipated antivirus and anti-malware programs, so many targeted infections may successfully compromise computing devices. Once a computing device is compromised, the compromised device may install, configure, pull or otherwise gather information from the internet and/or other compromised devices to identify one or more C2 servers. The C2 server may pass initialization information, such as through use of a preconfigured image file including steganographically encoded information that has been posted on a predetermined website. In some cases, an identification of the website and/or a particular image file may be included with the installed malware. Once downloaded, the malware installed on a compromised device may decrypt and process the steganographic information and confirm to the C2 server a successful installation on the targeted device and/or network such as by updating the downloaded image with additional or substitute steganographic information and posting the updated image file to provide confirmation to the C2 server. In some cases, malware installed on a compromised device may update an image locally sourced on the compromised device, either pre-existing on the computing device or included with the malware package and may post the image to one or more pre-configured image hosting websites and/or may be associated with a pre-configured user account.

In some cases, an illustrative command and control server using steganography may utilize a known repository (e.g., a publicly available image repository website) configured with images that may be tied to either a blog, a news site, a really simply syndication (RSS) feed, a web-based photo site, a news aggregation website, a news website, a stock image website and/or other websites with images, where advertisements and/or images may be updated, such as with commands from the C2 server. In some cases, the C2 server-side may have a source for user-defined and/or pre-configured set of images or may use a user defined uniform resource locator (URL) to pull images periodically from one or more image sources to then use when passing commands via steganography to one or more compromised computing devices. In some cases, malware installed on the compromised device may be configured with information about one or more image hosting sites being utilized. In some cases, the C2 server may provide and/or update compromised devices, periodically or occasionally, with the information about utilized image hosting sites leveraged for communications between the C2 server and one or more compromised devices. Such sites may be used generally or may be used based on a specific compromised target network or device. The information about the utilized image hosting sites may be in the form of a path to the images, one or more URLs from which images may be posted or pulled via one or more different protocols, a steganographic pass phrase used both by a client (e.g., a compromised device) and a server (e.g., the C2 server). In some cases, the compromised device configuration information may include a URL configured for it to pull images periodically to then use by passing commands via steganography. In some case, the compromised device may be configured with a path to local images on the compromised computing device, shared network drive, additional compromised machine, and the like, so that a malicious implant can be updated to use a particular path once machine is compromised so that proxy pulls from external sites can be reduced or minimized.

FIG. 1 shows an illustrative computing environment 100 including a command and control steganographic communications detection engine 124 monitoring a networked computing system 110 in accordance with one or more aspects described herein. The illustrative networked computing system 110 may include a plurality of computing devices, such as a network security computing system 120, a network communications server 150, and/or one or more computing devices 140 (e.g., servers 142, workstations 144, user devices, and the like) communicatively coupled via a secure network 105 to an enterprise computing system (e.g., networked computing system 110). In some cases, one or more computing devices (e.g., compromised computing device 130) may be exposed to malware, viruses, or other malicious attack attempting to access private or secure information of an enterprise network. In some cases, such as with command and control malware attacks, external computing devices may attempt to gain access to secure or private information stored on the networked computing system 110 via the compromised computing device 130. For example, a command and control (C2) server 160 may be configured to send commands and/or otherwise control one or more computing machines, such as the compromised device 130, that may be compromised by malware, ransomware, or other such malicious software.

In some cases, a target computing device may be infected by malware or other malicious software via an email attachment or drive-by link that, when executed, may load a malicious program to begin its operations. When infected, the malicious software may be unpacked within the operating kernel of the compromised device 130, for example, as a device driver to maintain persistence on the system and/or to evade detection. In some cases, the malicious code may send a beacon out to the C2 server 160 to look for its next instruction set. Most malware may pre-programmed with an autonomous command to attempt to set up a communications channel that originates from the target machine. For example, the compromised device 130 may process one or more domain names and/or IP addresses that may be used when trying to connect with the C2 server 160. Often, enterprise organizations may configure their network security computing system 120 with stringent outbound firewall rules, so that common malware may have difficulty in establishing a communication channel with the C2 server 160. Because of this, both the malicious actors and network security computing systems will evolve over time in an attempt to keep ahead of the other.

In some cases, malware installed on the compromised device 130 may communicate using an internet relay chat (IRC) via text messages by first initiating communication by sending a ready state and waiting for a response from the C2 server 160 and must send timed beacons to keep the session alive. As enterprise organizations have implemented tighter controls via the network security computing system traffic sent and received via the secure network 105, malware operators have modified which communications channels are used. Because many companies still allow unfiltered access over known ports used for HTTP, HTTP secure (HTTPS), FTP, and secure shell (SSH), malware may tunnel communications via these ports. Additionally, advanced malware may use secure sockets layer (SSL) certificates with encrypted messages and disguise the communications as web traffic. Once the communications channel is established via the internet 125, the C2 server instructs the malware to download additional rootkits and/or remote access tools on the compromised host. Once the compromised machine's communication channel with the C2 server 160 is established the malicious actors may attempt to move laterally within the secure network 110 to infect additional hosts to create a redundant set of compromised devices. Because network security computing systems evolve, the malicious actors continually evolve their methods and may use additional encryption techniques and methods in an attempt to avoid detection by the network security computing system 120, such as by using steganographic files for communication between the compromised device 130 on a targeted enterprise networked computing system 110 and the C2 server 160.

In an illustrative example, a steganographic-centric C2 attack may begin with the compromised computing device 130 executing a request (e.g., a GET request) using a pre-programmed URL (e.g., "URL for Post/Get") configured as an external site to provide steganographic files (e.g., POST) and/or receive steganographic files (e.g., GET) to provide information to the C2 server 160 and to receive commands from the C2 server 160. If the compromised computing device 130 retrieves a new communication string based on date/time of a last pull from the URL, then the compromised computing device 130 may retrieve any images from the post, decrypt the steganographic content from the image, and may execute whatever commands were decrypted. Once executed, any results from the command execution may be steganographically encrypted into a new image based on preconfigured link to a sending image set (e.g., "URL to images"), the compromised computing device 130 may then execute a POST command against the "URL for POST/GET" to push back the new steganographic image containing any encrypted responses to the previously received commands from the C2 server 160. In general, the C2 server 160 may push all commands the attacker wants to run to a selected website (e.g., a blog, a news site, a resource description framework (RDF) site summary (RSS) based photo site, a web-based photo site, and the like) where the compromised computing device 130 may pull instructions and return results from execution of the commands. The compromised device 130 is may be responsible for all push/pull communications to the pre-programmed external site to retrieve instructions and to report results from the decrypted commands. In general, the external website may be an intermediary hosting site between the C2 server 130 and any compromised device(s). If, for any reason, the initial pre-programmed site (e.g., "URL for POST/GET of images" such as an image hosting web site 180) was down, either due to a control team taking it down or due to a normal outage, the compromised device 130 and the C2 server would automatically revert to the next command posting website listed in its configuration. In some cases, separate command websites and result websites may be used and in other cases a same site may be used for posting commands by the C2 server 160 and returning results from the compromised device 130. In some cases, images used by one or both of the compromised computing device 130 and the C2 server 160 may be pulled form a same image source 170 or different image sources.

Figure 2:
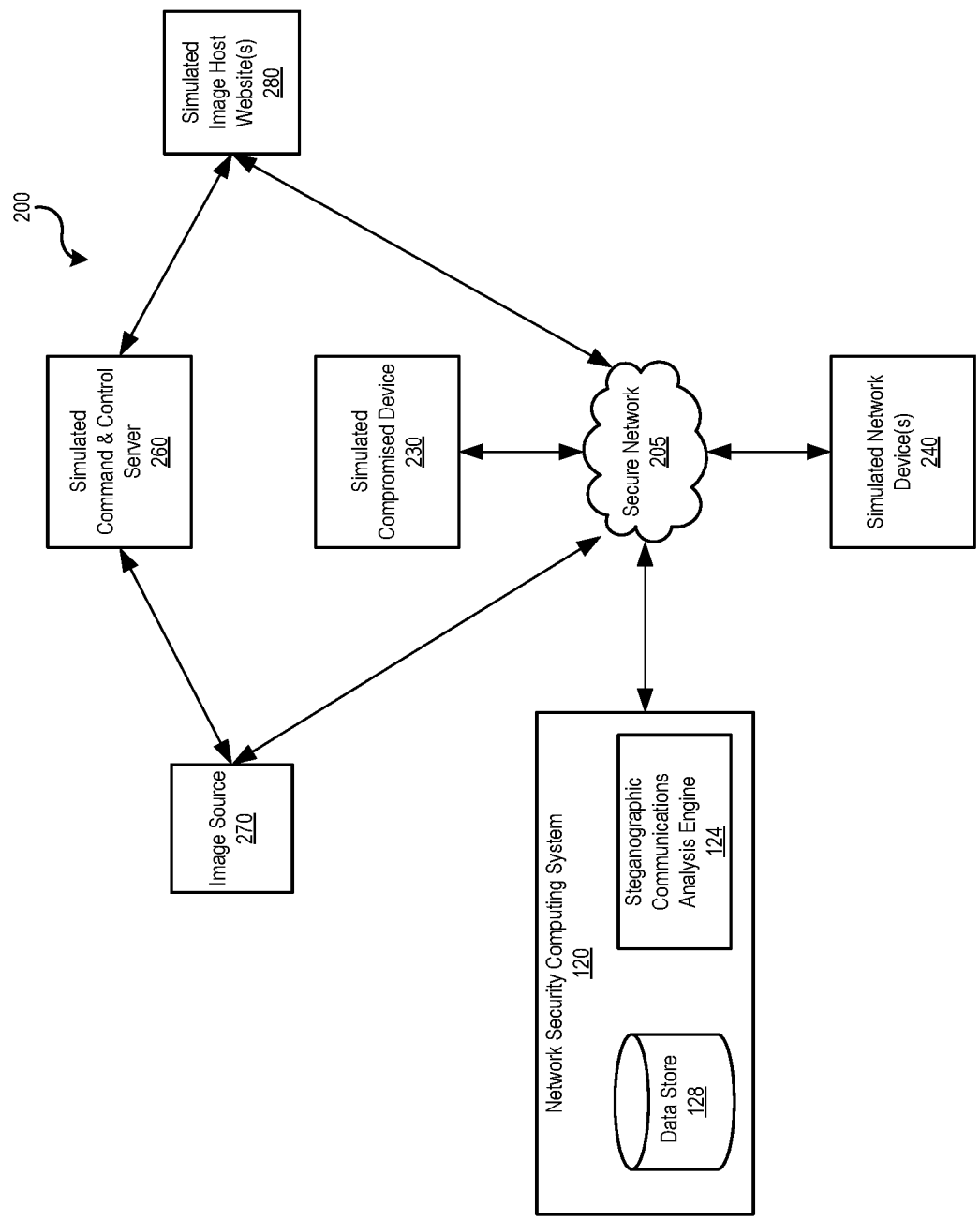
FIG. 2 shows an illustrative block diagram showing an example of a command and control steganographic communications detection engine undergoing testing in accordance with one or more aspects described herein.

FIG. 2 shows an illustrative example of a command and control steganographic communications analysis engine 124 undergoing testing in accordance with one or more aspects described herein. For example, the network security computing system 120 may include the steganographic analysis engine 124 and a data store 128 storing a knowledge base that may include information corresponding to patterns of activity concerning posting files (e.g., image files, audio files, and the like) to websites, patterns of activity concerning retrieval of files from websites, devices performing the actions, patterns of activity by devices following posting and/or retrieval of files to external websites, and the like. The knowledge base may be a learned knowledge base that is learned, in part, from testing via a simulated command and control infected computing test system 200 as shown in FIG. 2. The test system 200 may include the network security computing system 120, communicating via a network 205, which may be an isolated testing network or a network similar to the secure network 105 of the enterprise organization. The simulated testing system may include one or more devices, either real or simulated, configured to simulate a compromised network situation and may include one or more simulated network devices 240, at least one simulated compromised device 230, a simulated command and control server 260, an image hosting website that may be an external image hosting website or a simulated image hosting website 280 internal to the enterprise organization's testing environment, and one or more image sources that may be a data store, a simulated website, or the like.

In an illustrative example, the simulated C2 server 260 may be a command and control solution used by an enterprise network security team to test applications and control team responses to ensure that web-based services (e.g., an online banking service, an online shopping service, and the like) that utilize and/or incorporate user or enterprise private or secure information are not vulnerable to a malicious attack by a nation state or a nefarious threat actor looking to unlawfully access enterprise or user proprietary or confidential data. This simulated C2 server 260 may be used to test and refine a security tool, such at the steganographic communications analysis engine 124 may be a software tool that utilizes steganography to test applications, services and the like in use, for example, by enterprise organizations to ensure that stenography-based command and control attacks cannot bypass system level network security controls that would typically stop nefarious threat actors from gaining access to internal enterprise solutions, proprietary, user confidential or private data and the like, regardless of the industry. In some cases, the steganographic communications analysis engine 124 may be configured to identify encrypted data encapsulated via steganography in files that may be sent in plain sight across a network between an implanted or otherwise compromised host computing device (e.g., the compromised computing device 130) and the C2 server 160 either residing external to the network or internal to the network, such as on another subnet, to facilitate communication between the C2 server 160 and the compromised computing device 130. Such a solution allows a network security computing system to perform environment analysis of a system to identify compromised computing devices attempting to bypass network security controls, because current solutions analyze connections, but not content of communications sent to and from the internet.

The test system 200 may utilize steganography from at least one image source 270, where the images may be either images local to a host machine or pulled from the internet using a predefined list of URLs associated with image sites. Steganography may be used by the simulated C2 server 260 to encrypt C2 commands and controls into selected images retrieved from the image source 270. Images, such as those sourced from the internet, may be taken from the enterprise, such as a logo, or may be sourced based on a theme (e.g., wild life, sports, food, and the like). The simulated C2 server 260 and/or the simulated compromised device 230 may use steganography to encapsulate encrypted data into an image to communicate through otherwise non-encrypted channels, such as using HTTP commands like "get" and "put" to retrieve images from and to post images to the simulated image host website(s) 280.

Figure 3:
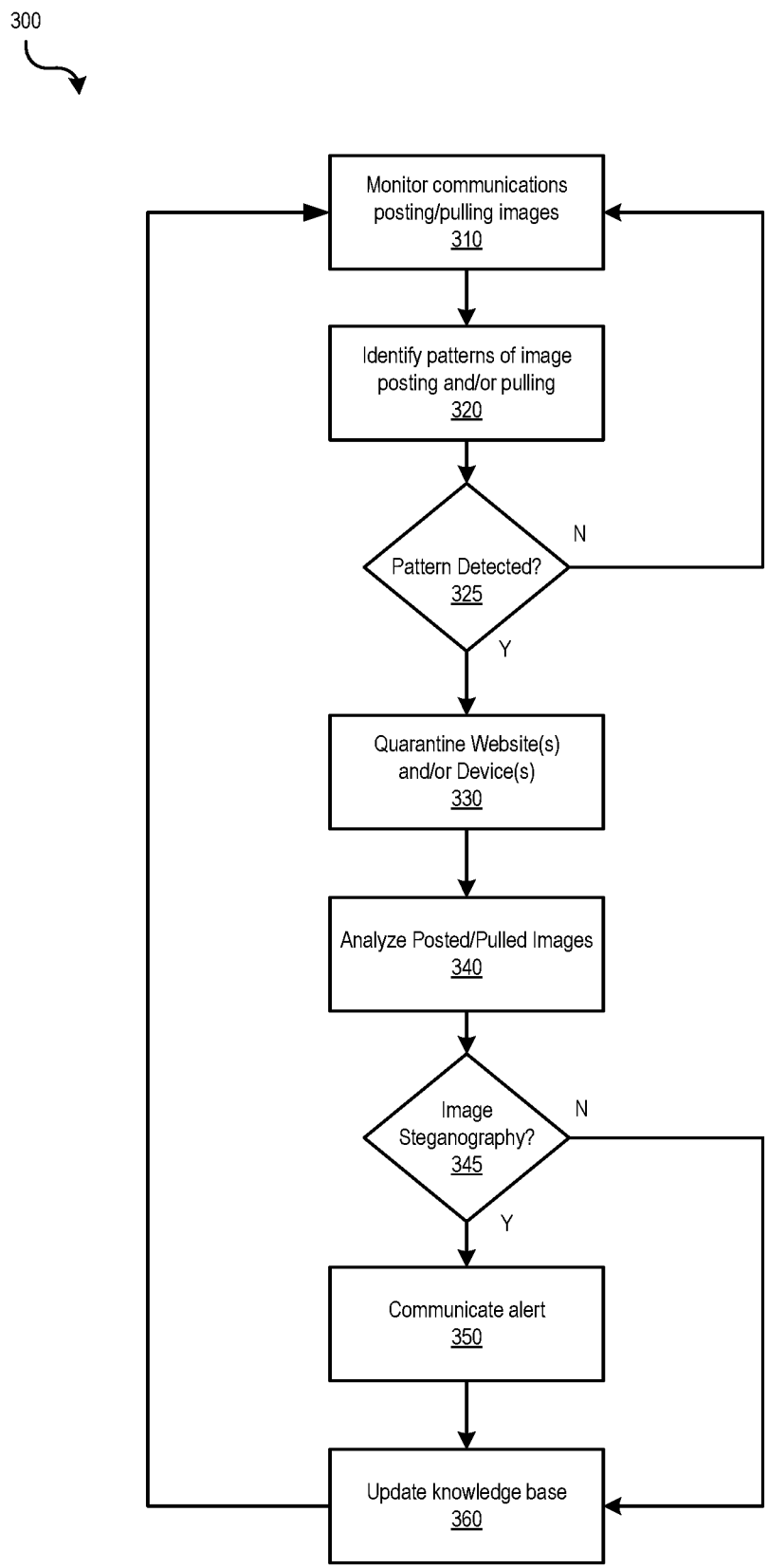
FIG. 3 shows an illustrative method for testing a command and control steganographic communications detection system in accordance with one or more aspects described herein.

FIG. 3 shows an illustrative method 300 for testing and/or operation of a command and control steganographic communications analysis engine 124 in accordance with one or more aspects described herein. At 310, the steganographic communications analysis engine 124 may monitor incoming and outgoing messages for commands corresponding to posting or pulling images from a website on the internet or a simulated image host website 280. For example, the steganographic communications analysis engine 124 may identify put commands, get commands and log information corresponding to each command, such as file metadata (e.g., a file type, a date, a name, a size, location information, user information and the like), a source (e.g., a computing device, a host, a server, and the like), a destination (e.g., a device, a website, and the like), and the like. The identified information for each command may be logged in the data store 128 for further analysis, such as for identifying patterns of pulling and/or posting of files to the internet or, in some cases, other network devices. At 320, the steganographic communications analysis engine 124 may analyze the logged information stored in the data store 128 to identify one or more patterns of image posting and/or pulling that may be indicative of a compromised computing device, such as the compromised computing device 130 or the simulated compromised computing device 230. Here, the steganographic communications analysis engine may be programmed, taught or may otherwise learn to differentiate between common user activities and activities that may correspond with a computing device compromised by command and control malware that may encode communications via steganography, such as by using one or more machine learning or other artificial intelligence algorithms, such as by using linear regression models (e.g., basis function models, Bayesian linear regression models, and the like), neural networks, gaussian processes, graphical models, sparse kernel machines, and the like. To identify suspect patterns of activity, the steganographic communications analysis engine 124 may learn to differentiate human activity, such as individuals posting or retrieving files to/from social media websites, blogs, and image hosting websites from activity indicative of a simulated compromised machines posting/pulling files from an image hosting website that may include commands from the C2 server 160. Indications of messages to and/or from the compromised computing device 130 may include posting and/or retrieval of a single file, posting of a modified version of a same file multiple times, posting or retrieval of a same file multiple times, posting of a file to a single website or to a common pattern of websites, and the like. In some cases, the steganographic communications analysis engine 124 may compare communications to known patterns of suspect activity stored in the knowledge base stored in the data store 128. If, at 325, not pattern is recognized, monitoring of network communications continues at 310.

If, at 325, a pattern is identified, then the steganographic communications analysis engine 124 may store information corresponding to the pattern in the knowledge data store and may quarantine a suspect machine (e.g., the compromised computing device 130) and/or access to associated suspect internet (or internal) destinations/sources for communications, such as the image hosting website 180, at 330. At 340, the steganographic communications analysis engine 124 may analyze suspected files or images to be posted to or pulled from the image host website 180 to determine whether the suspect files or images include information encoded through steganography at 345. If not, the knowledge data base 180 may be updated with the information at 360 before monitoring continues at 310. If, however, steganography has been identified at 345, an alert may be generated, quarantine of the compromised device 130 may continue and/or network communications may be disabled at 350 and the knowledge data base may then be updated at 360.

Figure 4:
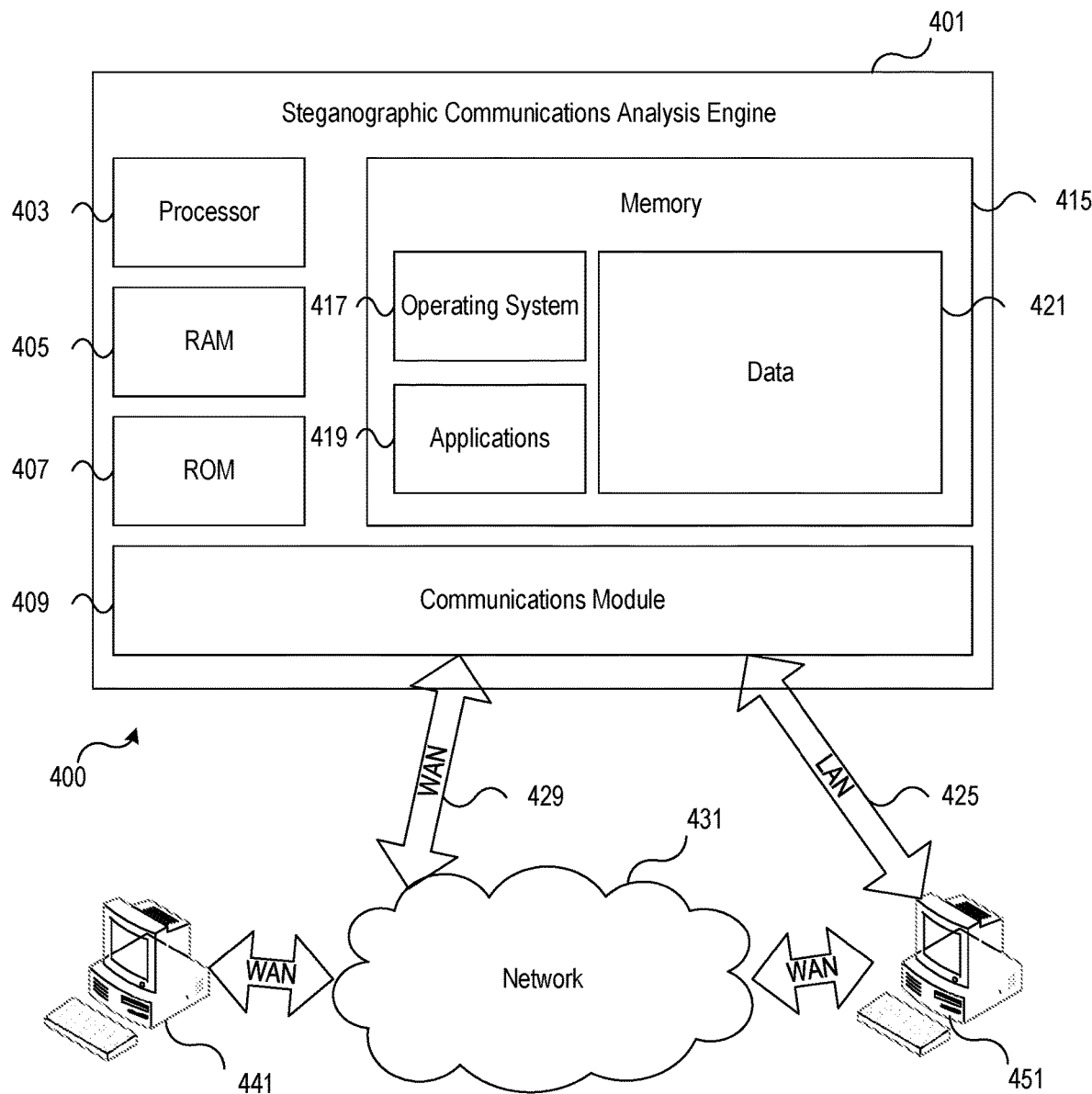
FIG. 4 shows an illustrative operating environment in which various aspects of the disclosure may be implemented in accordance with one or more aspects described herein.

FIG. 4 shows an illustrative operating environment in which various aspects of the present disclosure may be implemented in accordance with one or more example embodiments. Referring to FIG. 4, a computing system environment 400 may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the illustrative computing system environment 400.

The computing system environment 400 may include an illustrative steganographic communications analysis engine 401 having a processor 403 for controlling overall operation of the steganographic communications analysis engine 401 and its associated components, including a Random Access Memory (RAM) 405, a Read-Only Memory (ROM) 407, a communications module 409, and a memory 415. The steganographic communications analysis engine 401 may include a variety of computer readable media. Computer readable media may be any available media that may be accessed by the steganographic communications analysis engine 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the steganographic communications analysis engine 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 403 of the steganographic communications analysis engine 401. Such a processor may execute computer-executable instructions stored on a computer-readable medium.

Software may be stored within the memory 415 and/or other digital storage to provide instructions to the processor 403 for enabling the steganographic communications analysis engine 401 to perform various functions as discussed herein. For example, the memory 415 may store software used by the steganographic communications analysis engine 401, such as an operating system 417, one or more application programs 419, and/or an associated database 421. In addition, some or all of the computer executable instructions for the steganographic communications analysis engine 401 may be embodied in hardware or firmware. Although not shown, the RAM 405 may include one or more applications representing the application data stored in the RAM 405 while the steganographic communications analysis engine 401 is on and corresponding software applications (e.g., software tasks) are running on the steganographic communications analysis engine 401.

The communications module 409 may include a microphone, a keypad, a touch screen, and/or a stylus through which a user of the steganographic communications analysis engine 401 may provide input, and may include one or more of a speaker for providing audio output and a video display device for providing textual, audiovisual and/or graphical output. The computing system environment 400 may also include optical scanners (not shown).

The steganographic communications analysis engine 401 may operate in a networked environment supporting connections to one or more remote computing devices, such as the computing devices 441 and 451. The computing devices 641 and 651 may be personal computing devices or servers that include any or all of the elements described above relative to the steganographic communications analysis engine 401.

The network connections depicted in FIG. 6 may include a Local Area Network (LAN) 625 and/or a Wide Area Network (WAN) 429, as well as other networks. When used in a LAN networking environment, the steganographic communications analysis engine 401 may be connected to the LAN 425 through a network interface or adapter in the communications module 409. When used in a WAN networking environment, the steganographic communications analysis engine 401 may include a modem in the communications module 409 or other means for establishing communications over the WAN 429, such as a network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
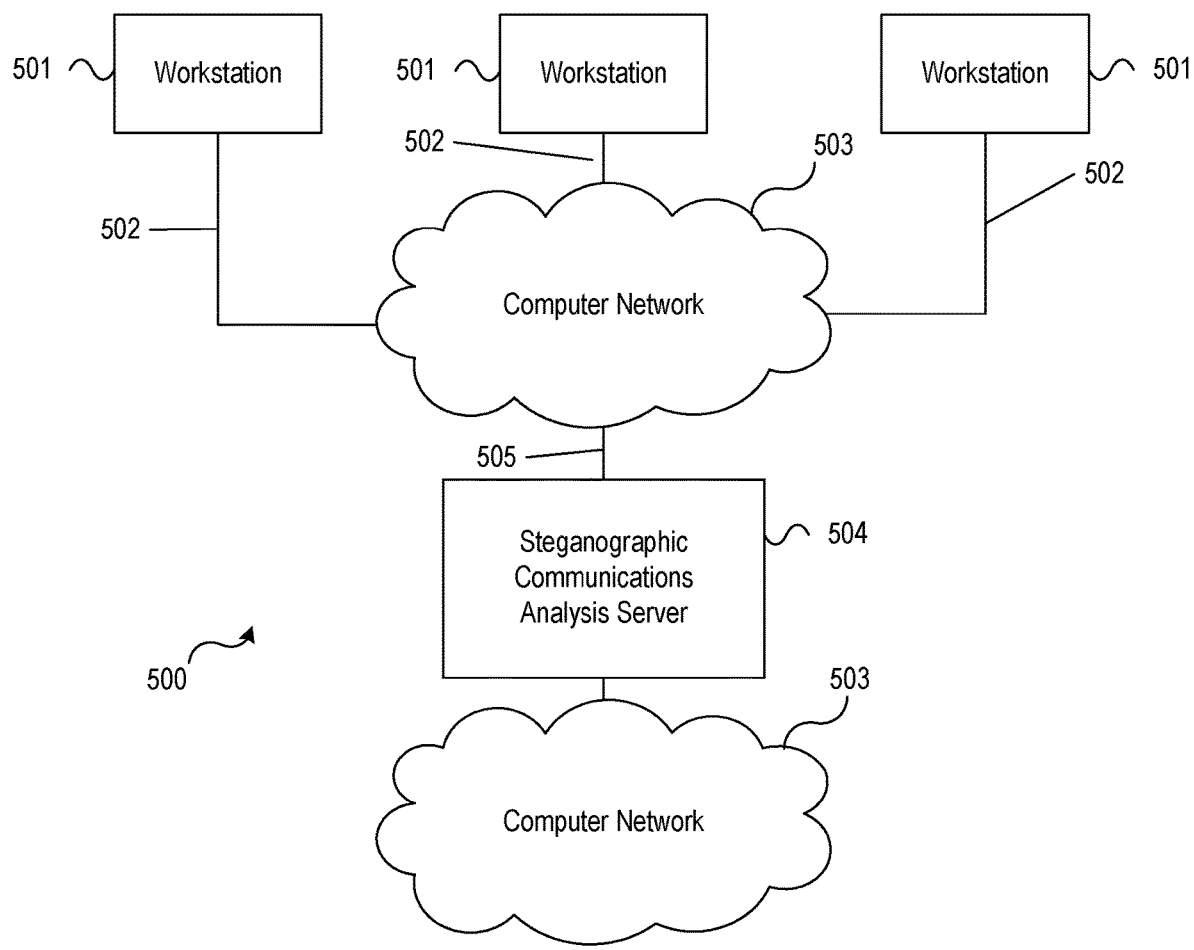
FIG. 5 shows an illustrative block diagram of workstations and servers that may be used to implement the processes and functions of certain aspects of the present disclosure in accordance with one or more aspects described herein.

FIG. 5 shows an illustrative block diagram of workstations and servers that may be used to implement the processes and functions of certain aspects of the present disclosure in accordance with one or more example embodiments. For example, an illustrative system 500 may be used for implementing illustrative embodiments according to the present disclosure. As illustrated, the system 500 may include one or more workstation computers 501. The workstation 501 may be, for example, a desktop computer, a smartphone, a wireless device, a tablet computer, a laptop computer, and the like, configured to perform various processes described herein. The workstations 501 may be local or remote, and may be connected by one of the communications links 502 to a computer network 503 that is linked via the communications link 505 to the steganographic communications analysis server 504. In the system 500, the steganographic communications analysis server 504 may be a server, processor, computer, or data processing device, or combination of the same, configured to perform the functions and/or processes described herein. The steganographic communications analysis server 504 may be used to monitor network communications, identify potential instances of steganographic communications, quarantine suspected compromised device, generate alerts, and the like.

The computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 502 and 505 may be communications links suitable for communicating between the workstations 501 and the steganographic communications analysis server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A method comprising:
monitoring, by a steganographic communications analysis engine, a plurality of incoming and outgoing messages on a secure network;
identifying, by the steganographic communications analysis engine based on a knowledge base comprising patterns identified via use of a simulated command and control server, a pattern of file transfers pulling and posting images between a computing device on the secure network and a common group of image hosting websites, wherein the pattern comprises pulling and retrieving a same file multiple times;
quarantining, based on an identified pattern of file transfers matching a simulated pattern identified via the simulated command and control server operation, the computing device from the secure network;
analyzing, by the steganographic communications analysis engine, at least one file transferred between the computing device and the common group of image hosting websites for an indication of steganography; and
causing display, by the steganographic communications analysis engine based on the indication of steganography, an indication that the computing device had been compromised by command and control malware.

2. The method of claim 1, wherein quarantining the computing device from the secure network comprises disabling incoming and outgoing communications from the computing device.

3. The method of claim 1, wherein the plurality of incoming and outgoing messages comprises a plurality of image file transfers.

4. The method of claim 1, wherein the indication that the computing device had been compromised by command and control malware comprises an alert comprises an electronic message comprising an indication of the quarantined computing device, information corresponding to the identified pattern of file transfers and a link to an image file and information corresponding to identified stenographic encoded information.

5. The method of claim 1, further comprising disabling, by the steganographic communications analysis engine, network access to the common group of image hosting websites.

6. The method of claim 1, wherein the common group of image hosting websites comprises an internet website.

7. The method of claim 1, wherein the common group of image hosting websites comprises a second computing device on the secure network.

8. An apparatus comprising:
a processor; and
non-transitory memory storing instructions that, when executed by the processor, causes the apparatus to:
monitor a plurality of incoming and outgoing messages on a secure network;
identify, based on a knowledge base comprising patterns identified via use of a simulated command and control server, a pattern of file transfers between a computing device on the secure network and a common group of image hosting websites, wherein the pattern comprises pulling and retrieving a same file multiple times;
quarantine, based on an identified pattern of file transfers, the computing device from the secure network;
analyze at least one file transferred between the computing device and the common group of image hosting websites for an indication of steganography; and
cause display, based on the indication of steganography, an indication that the computing device had been compromised by command and control malware.

9. The apparatus of claim 8, wherein the instructions, when executed by the processor, that cause the apparatus to quarantine the computing device from the secure network further cause the apparatus to disable incoming and outgoing communications from the computing device.

10. The apparatus of claim 8, wherein the plurality of incoming and outgoing messages comprises a plurality of image file transfers.

11. The apparatus of claim 8, wherein the indication that the computing device had been compromised by command and control malware comprises an alert comprises an electronic message comprising an indication of the quarantined computing device, information corresponding to the identified pattern of file transfers and a link to an image file and information corresponding to identified stenographic encoded information.

12. The apparatus of claim 8, wherein the instructions, when executed by the processor, further cause the apparatus to disable network access to the simulated command and control server.

13. The apparatus of claim 8, wherein the simulated command and control server comprises an internet website.

14. The apparatus of claim 8, wherein the simulated command and control server comprises a second computing device on the secure network.

15. The apparatus of claim 8, wherein the computing device and the simulated command and control server are simulations of a compromised network in a testing environment.

16. A system comprising:
a first computing device communicatively coupled to a network; and
a second computing device comprising:
a processor; and non-transitory memory storing instructions that, when executed by the processor, causes the second computing device to:

monitor a plurality of incoming and outgoing messages on a secure network;

identify a pattern of file transfers between the first computing device on the secure network and a common group of image hosting web sites, wherein the pattern comprises a pattern of pulling and retrieving a same file multiple times and wherein the pattern is identified via simulations of a simulated command and control server environment;

quarantine, based on an identified pattern of file transfers, the first computing device from the secure network;

analyze at least one file transferred between the first computing device and the simulated command and control server environment for an indication of steganography; and cause display, based on the indication of steganography, an indication that the first computing device had been compromised by command and control malware.

17. The system of claim 16, wherein the instructions, when executed by the processor, that cause the second computing device to quarantine the computing device from the secure network further cause the second computing device to disable incoming and outgoing communications from the computing device.

18. The system of claim 16, wherein the plurality of incoming and outgoing messages comprises a plurality of image file transfers.

19. The system of claim 16, wherein the indication that the computing device had been compromised by command and control malware comprises an alert that comprises an electronic message comprising an indication of the first computing device, information corresponding to the identified pattern of file transfers and a link to an image file and information corresponding to identified stenographic encoded information.

20. The system of claim 16, wherein the compromised computing device and the simulated command and control server environment are simulations in a testing environment.

* * * * *